US008497904B2

(12) United States Patent
Jelinek et al.

(10) Patent No.: US 8,497,904 B2
(45) Date of Patent: Jul. 30, 2013

(54) SYSTEM AND METHOD OF TARGET BASED SMOKE DETECTION

(75) Inventors: Jan Jelinek, Plymouth, MN (US); Kwong Wing Au, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 1007 days.

(21) Appl. No.: 12/549,115

(22) Filed: Aug. 27, 2009

(65) Prior Publication Data

US 2011/0050894 A1 Mar. 3, 2011

(51) Int. Cl.
*H04N 7/18* (2006.01)

(52) U.S. Cl.
USPC ............ 348/143; 348/164; 382/100; 382/181

(58) Field of Classification Search
USPC ................... 348/143, 162, 164; 382/100, 181
See application file for complete search history.

(56) References Cited

U.S. PATENT DOCUMENTS

| | | | | |
|---|---|---|---|---|
| 4,614,968 | A | 9/1986 | Rattman et al. | |
| 6,937,743 | B2 * | 8/2005 | Rizzotti et al. | 382/100 |
| 7,286,704 | B2 * | 10/2007 | Pfefferseder et al. | 382/181 |
| 7,495,573 | B2 | 2/2009 | Tice et al. | |
| 7,495,767 | B2 | 2/2009 | Kim et al. | 356/438 |
| 2003/0038877 | A1 | 2/2003 | Pfefferseder et al. | |
| 2004/0175040 | A1 | 9/2004 | Rizzotti et al. | |

OTHER PUBLICATIONS

European Search Report, dated Oct. 19, 2012, corresponding to Applciation No. EP 10 17 2520.

* cited by examiner

*Primary Examiner* — David Lazaro
(74) *Attorney, Agent, or Firm* — Husch Blackwell LLP

(57) ABSTRACT

A smoke detector includes processing circuitry coupled to a camera. The field of view of the camera contains one or more targets, each having spatial indicia thereon. The processing circuitry collects a sequence of spatial frequency measures, such as contrast indicating parameters. Members of the sequence can be compared to at least one reference spatial frequency measure to establish the presence of smoke between the target and the camera.

19 Claims, 6 Drawing Sheets

38

CONTRAST

- CONTRAST = $(i_{WHITE\ BAR} - i_{BLACK\ BAR}) / (i_{WHITE\ BAR} + i_{BLACK\ BAR})$

OPERATION SCENARIOS

SYSTEM LEVEL BLOCK DIAGRAM

CONTRAST BASED SMOKE DETECTION

TEMPORAL SMOKE DETECTION

SYSTEM AND METHOD OF TARGET BASED SMOKE DETECTION

FIELD

The invention pertains to smoke detectors. More particularly, the invention pertains to smoke detectors which process images of pre-established targets in making a determination as to presence of smoke.

BACKGROUND

Numerous commercial products are offered for smoke detection in small confined areas, such as rooms, and hallways in a house. They achieve performance according to published guide lines.

These smoke/fire detectors, however, are impractical in large areas with high ceilings, such as auditorium, theater, factory, and aircraft hangar, since these detectors are point sensors and detect smoke only in a small local vicinity to the detector. As a result, large numbers of these detectors are needed.

Installation on high ceilings is difficult. Furthermore, smoke may be dispersed and not reach the height of the ceiling to be detected. Projected and reflected beam smoke detectors, which predict the presence of smoke through measurements of the attenuation of a light beam, are possible solutions. However, in addition to having limited sensitivity, beam-based detectors require precise alignment between the source emitter and the light receiver. Hence such detectors are costly to install and maintain.

There is thus a need for detectors which overcome cost and installation problems associated with known beam-based detectors.

DETAILED DESCRIPTION

Figure 1:
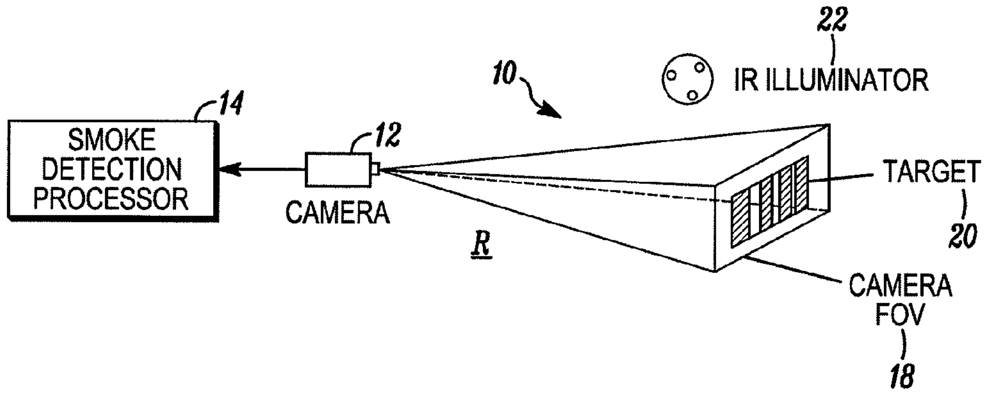
FIG. 1 is a block diagram of a system which embodies the present invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Embodiments of the current invention use a patterned target and a video camera to detect the smoke. Such systems can be expected to perform better and require simple steps in installation and very minimal maintenance, thus providing a cost-effective alternate to the beam-based smoke detector.

In one aspect, a system in accordance with the invention can include a smoke detector processor, a camera, a patterned target, and optionally an illuminator preferably an near infrared (NIR) or low power led light. The processor, whose function is to determine whether smoke is present in the captured image, can be implemented as one of a personal computer, a digital signal processor, a programmable gate array or an application specific integrated circuit all without limitation.

The camera has sufficient spatial resolution and captures images of the patterned target, which is located at a predetermined distance from the camera. The camera can respond to visible or NIR depending on the application and environment. The target preferably contains patterns of different spatial resolutions, for example, black and white interlaced stripes or grids of different widths.

The optional (NIR) illuminator shines (NIR) light onto the target. The illuminator is suitable for applications where smoke detection in total darkness is required.

With reference to FIG. 1, a system 10, which embodies the invention, monitors a region R for smoke. A camera 12, having a field of view 18, is directed toward a test target 20. The test target 20 is mounted, spaced apart from camera 12, at a distance away, e.g., at a certain height on opposite walls of the region R being monitored.

The camera 12 can respond to visible or NIR radiant energy. The test target 20 has patterns representing one or more discrete spatial frequencies and/or continuous spectrum of the spatial frequencies, e.g., different sizes of black and white strips or squares.

Since spatial frequency has two dimensions, the frequencies or spectra can be measured in one or more directions, e.g., horizontally and vertically. A hardwired or programmable processor, along with associated control software prestored on a computer readable storage medium, such as semiconductor or magnetic storage circuits or devices, receives and processes the image(s) captured by the camera to determine the presence of smoke. An (NIR) illuminator, 22, can be used for smoke detection in complete darkness.

In yet another aspect of the invention, a full pan-tilt-zoom camera could be employed to allow for additional pattern targets, which are located at multiple locations of the site. Additional features, such as a feed to a remote display for verification by video can be implemented. The video feed may even be used for purposes beyond just smoke detection, such as security surveillance.

Feed from camera 12 is coupled to processing circuitry 14, which could be implemented with a programmable processor and pre-stored control software. An optional light source, such as near infra-red (NIR), 22 can be provided to illuminate the target 20 for monitoring in total darkness. Processing circuitry 14 determines, as explained below, if smoke is present in the region R. Circuitry 14 can include a computer readable storage device 14*a*, see FIG. 6, wherein various parameters can be stored and accessed by processor 14.

Figure 2:
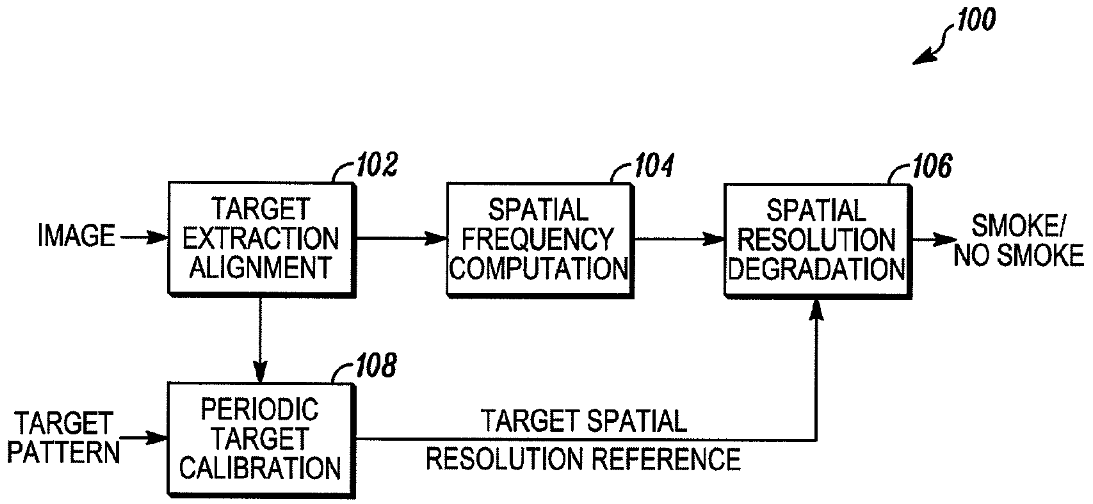
FIG. 2 is a flow diagram illustrating processing of the system of FIG. 1.

FIG. 2 illustrates a method 100 which can be implemented by system 10 in determining if smoke is present in region R. In the target extraction alignment block 102, the target is extracted from the captured image and aligned with the reference using an image segmentation technique as would be known to those of skill in the art and which need not be described further. Hence even if the target 20 is displaced or rotated during installation, this process automatically corrects the misalignment. Consequently, the system 10 does not require costly and precise alignment. Alternatively, the user can locate the target 20 in the image manually during the installation process and this fixed region of interest thus selected will then always be extracted from all operation images.

The extracted test target image is passed onto the Spatial Frequency Computation block 104, in which the contrast or a similar measure of spatial frequency attenuation at one or more spatial frequencies as present in the test target is measured and compared, block 106, to those of at least one pre-established reference from block 108.

Unlike the present invention, known video based smoke detection approaches use flicker, color, or intensity attenuation as the criteria for smoke detection. Flickering depends on the smoke density and combustion state, yielding a very large uncertain dynamic range for smoke detection. Color of the smoke depends on the burning material. Intensity of the smoke is based on the amount of fuel, state of the burning, and the surrounding illumination. These variations result in imprecise smoke detection and produce undesirable false detections. Note that contrast does not depend on the intensity nor the color of the illumination on the target.

Spatial Resolution Degradation detects the presence of the smoke by a comparison of the input spatial frequencies with that of the smoke-free reference target. This detection is based on the principle that smoke in the observation path will refract and scatter the light thus effectively acting as a low pass filter which reduces the spatial bandwidth of the target image as perceived by the camera. This bandwidth reduction changes the modulation transfer function (MTF) of the perceived signal, and this change can be either exactly measured or approximately quantified by means of contrast, or modulation depth at one or more spatial frequencies, or some other ways known to those knowledgeable in optics. This degradation of the contrast from the reference to the input target can be used to determine the presence of smoke. The spatial frequencies of the reference target is computed periodically in the Periodic Calibration block 108 by adjusting the pre-stored target image based on current operational conditions indicative of the patterned target in the absence of smoke.

Figure 3:
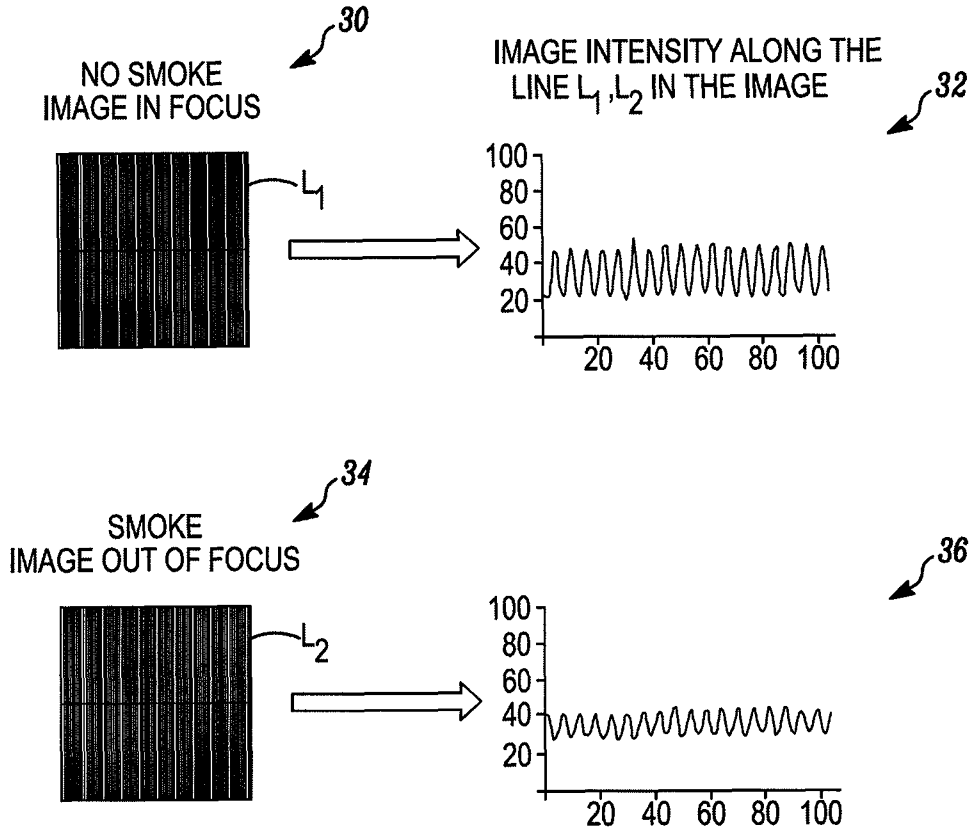
FIG. 3 illustrates aspects of contrast processing in accordance with the invention.

FIG. 3 illustrates aspects of contrast formation, which is the preferred spatial frequency measure. For a given spatial frequency, w, that corresponds to the bar width of the target pattern, contrast is computed using the formula:

$$\text{contrast } (w)=(I_{white}(w)-I_{black}(w))/(I_{white}(w)+I_{black}(w)),$$

where $I_x(w)$ is the intensity of the region x with spatial frequency, w.

In the absence of smoke, as illustrated in image 30, from a target such as 20, intensity across the image, along line L1 illustrates variations due to lighter and darker portions of the target. In the presence of smoke, as illustrated in image 34 the image becomes blurred, the white bars get darker and the dark bars get lighter due to the reduced light energy transfer for the corresponding spatial frequency of the target as illustrated by the drop in intensity amplitudes in the graph 36. Hence, attenuation of a contrast, as at 38 produces a smoke indicating parameter which is independent of intensity variations. Contrast for no smoke conditions, as at image 30 can then be compared to contrast for smoke indicating conditions, as at image 34 to make a determination as to the presence of smoke.

For smoke detection, the modulation depth can be used as an alternative to contrast. It is computed using the formula $$\text{modulation depth } (w)=(I_{white}(w)-I_{black}(w))/(I_{white}(0)-I_{black}(0))$$

The smoke detector can evaluate the contrast, modulation depth or similar measure at one or more spatial frequencies, w. Varying degrees of attenuation at multiple spatial frequencies due to smoke can be used to advantage for suppressing false alarms.

Figure 4:
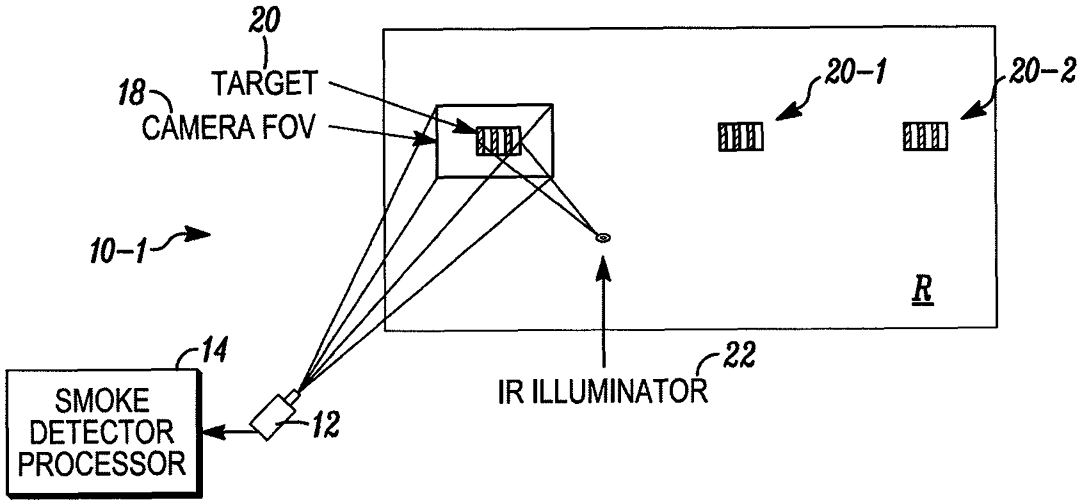
FIG. 4 illustrates operational scenarios of a system as in FIG. 1.

FIG. 4 illustrates a multi-target system 10-1. Exemplary camera 12 can be implemented as a pan, tilt, zoom-type (PTZ) camera which can scan targets such as 20, 20-1 and 20-2 at preset locations in the region R. Once smoke is detected, the origin of the fire that generated the smoke can be located by back tracing the smoke using the PTZ camera.

Alternately, a fixed camera and a single target can be used in a smaller area or region. In another embodiment, a single camera may have multiple targets at different locations and distances in its field of view. Since the choice of the test pattern depends on the target distance, the multiple targets may have different test patterns.

Figure 5:
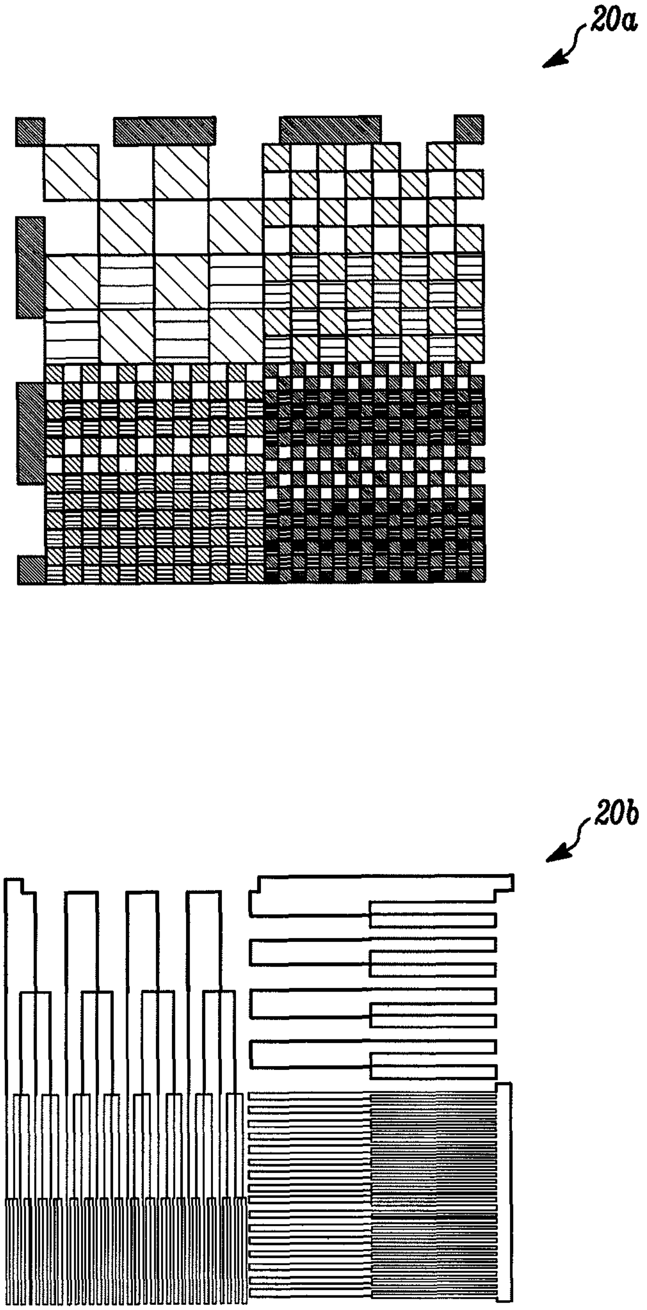
FIG. 5 illustrates aspects of an exemplary target.

FIG. 5 illustrates exemplary targets 20*a* and 20*b*. Each target includes a pattern of sets of stripes or blocks, which are alternating black and white, or have different gray values. Within each target pattern, the stripes and blocks have different widths. Each width is tuned to the detection of a specific density of smoke at a specific distance given a specific camera resolution. Therefore the system does not only detect the presence of smoke but also the density of the smoke. The widest set of stripes can be used for calibration.

Figure 6:
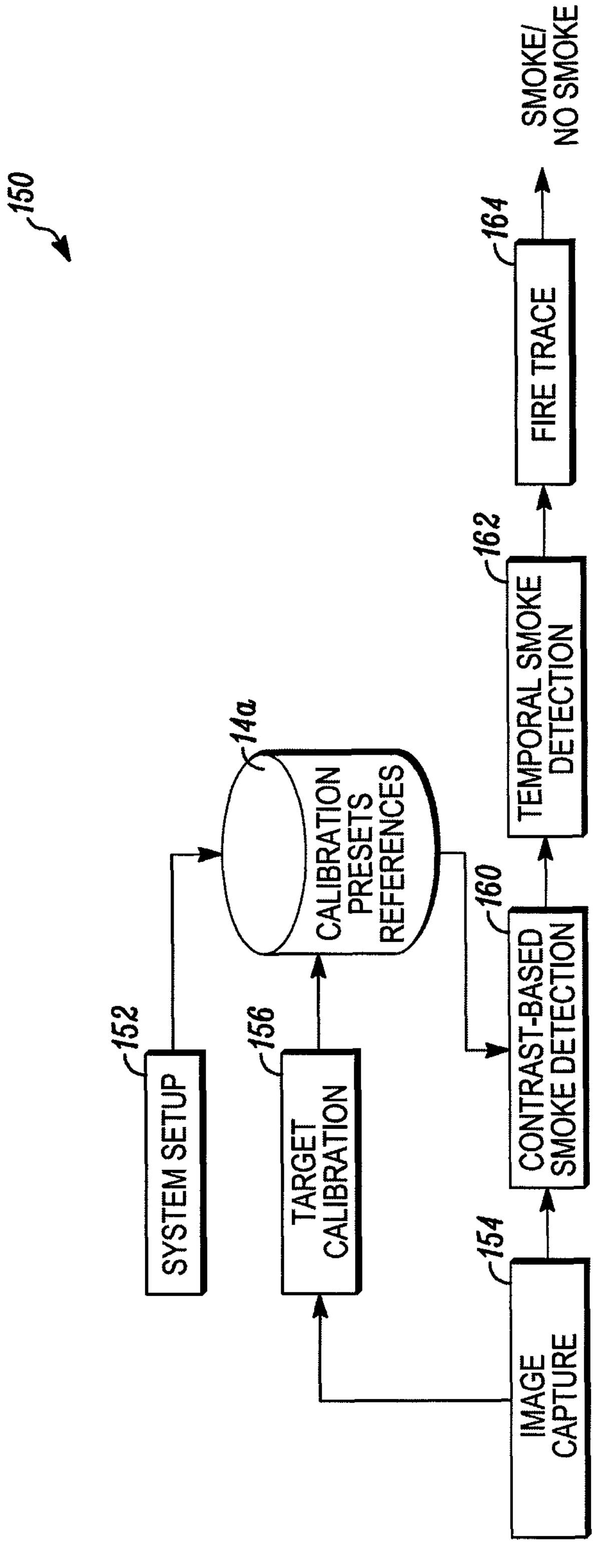
FIG. 6 is a flow diagram of an exemplary method of operation.

FIG. 6 illustrates aspects of a method 150 in accordance with the invention. System setup, as at 152, can specify field of view of the camera, a preset location of a pan tilt zoom camera, target location in the image and/or a contrast reference can be provided or updated. Capture of a target image, as at 154 can be used for calibration, as at 156, or to implement contrast-based smoke detection as at 160. Subsequently, temporal smoke detection can be carried out, as at 162. Optionally, with a pan tilt zoom type camera, the trace of the detected smoke can be followed back to where the fire originated, as at 164.

Figure 7:
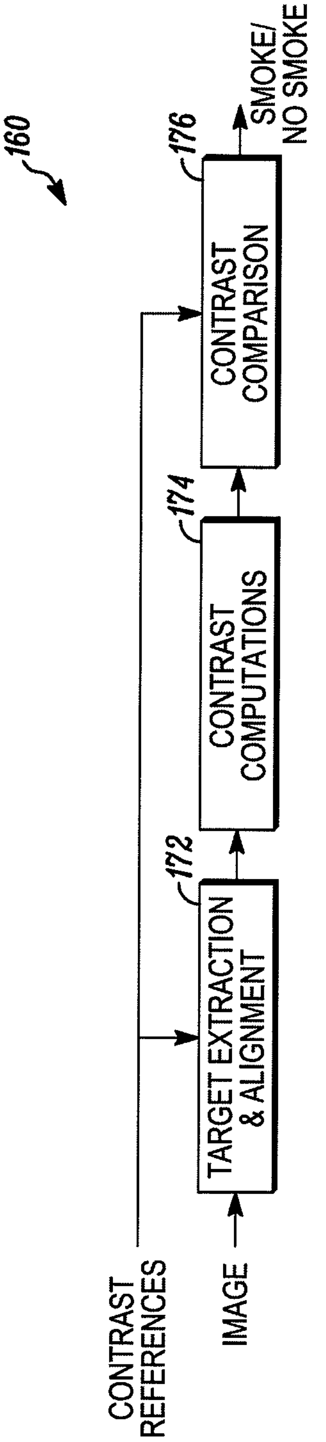
FIG. 7 is a flow diagram of contrast-based smoke detection.

FIG. 7 illustrates details of contrast based smoke detection 160. As illustrated therein target extraction and alignment can be implemented. For fixed camera, the target data can be extracted from the predetermined location within the image. For panning, tilting, zooming-type camera, the target can be located within the image using known image processing techniques. Then the known target can be extracted. Alignment of the camera can eliminate imaged target pattern distortion due to viewing perspective.

Contrast determinations, see FIG. 3, can be carried out, as at 174, for each set of black/white stripes (corresponding to each spatial frequency).

Contrast comparison processing, as at 176, determines the presence of smoke by comparing each contrast with a corresponding reference contrast. Such comparisons provide an indication of the amount of contrast degradation and hence, the amount of smoke.

Instead of contrast determinations and comparison, any of the measures known in optics for expressing the signal attenuation at a particular spatial frequency, such as the MTF, modulation depth, etc. as stated above can be computed and compared.

Figure 8:
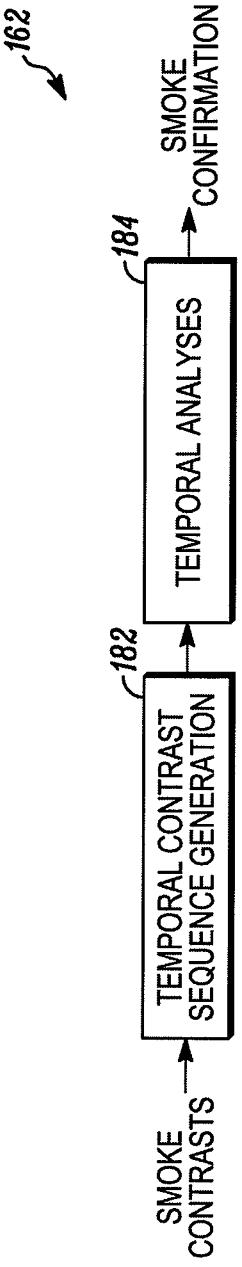
FIG. 8 illustrates aspects of temporal smoke detection.

Temporal smoke detection, as illustrated in FIG. 8 can include temporal based generation of sequences of contrasts as at 182. A dynamic behavior/pattern of the smoke based on changes of the contrasts in sequential image frames can be generated. Flicker rates can be determined. Trends in contrast degradation across all of the spatial frequencies present in the target can be established.

Temporal analysis, as at 184 can confirm the presence of smoke by matching the observed dynamic behavior/pattern of the smoke. For example, a determination can be made as to whether flicker rate is within an expected range. If no temporal changes are present in the contrast pattern, a reduced likelihood of smoke is indicated.

Other aspects of the invention also do not require that the test target be perpendicular to the camera. When the target is viewed at an angle off the optical axis of the camera, its image will be distorted. The calibration process estimates the distortion based on the ground truth, and either warps the target or corrects the measured contrast values accordingly if necessary. Any temporal affects in the environment, such as presence of dust, moisture, air turbulence can also be minimized from the calibration. This calibration feature provides a robust smoke detection, very minimal false detection, and diverse installation configurations.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A smoke detector comprising:

circuitry to establish reference measures of spatial frequencies relative to elements of a target, the target including a pattern with stripes or blocks of different widths, wherein each width is tuned to a specific density of smoke at a specific spatial resolution;

further circuitry to establish subsequent measures of spatial frequencies relative to elements of the target; and evaluation circuitry, responsive to the reference and subsequent measures, to establish the presence of a smoke condition and to detect a density of the smoke condition using the pattern.

2. A smoke detector as in claim 1 where the circuitry and further circuitry comprise common processing circuitry.

3. A detector as in claim 2 which includes an imaging device to acquire the first and second target images, output signals from the device are coupled to the common processing circuitry.

4. A detector as in claim 3 which includes target illumination circuits.

5. A detector as in claim 3 where the evaluation circuitry responds to a detected attenuation of the spatial frequency measures.

6. A detector as in claim 2 which includes circuitry to at least intermittently recalibrate the target to update the reference measures.

7. A detector as in claim 2 where the processing circuitry establishes a plurality of spatial frequency measures spaced apart in time.

8. A detector as in claim 2 where the processing circuitry establishes a spatially based plurality of spatial frequency measures associated with different targets.

9. A detector as in claim 2 which includes a target separate from the circuitry.

10. A detector as in claim 9 which includes a camera, separate from the target, coupled to the circuitry.

11. A detector as in claim 10 where the circuitry receives target related signals from the camera.

12. An ambient condition detector comprising:

control circuits to establish spatial frequency measures relative to a selected target, at one time, and to establish subsequent spatial frequency measures relative to the target at a subsequent time and which includes additional circuits to at least compare spatial frequency measures associated with different times to establish presence of smoke and to detect a density of the smoke using a pattern included in a target, wherein the pattern includes stripes or blocks with different widths, wherein each width is tuned to a specific density of smoke at a specific spatial resolution.

13. A detector as in claim 12 which includes a camera coupled to the control circuits.

14. A detector as in claim 13 where the camera includes at least one of pan, tilt, or zoom functionality.

15. A detector as in claim 13 where the control circuits generate a temporal sequence of spatial frequency measures.

16. A detector as in claim 15 where the additional circuits establish a smoke pattern responsive to sequential spatial frequency measures comparisons.

17. A detector as in claim 16 where establishing the smoke pattern includes establishing a flicker rate.

18. An ambient condition detector comprising:

control circuits to establish a plurality of spatial frequency measures relative to a plurality of selected, spaced apart targets and which includes additional circuits to at least compare spatial frequency measures associated with different targets to trace the smoke to a source and to detect a density of the smoke using a pattern included in a target, wherein the pattern includes stripes or blocks with different widths, wherein each width is tuned to a specific density of smoke at a specific spatial resolution.

19. A detector as in claim 12 where the control circuits associate a selected degree of contrast degradation with a specific concentration of smoke and circuits to manually establish a smoke sensitivity parameter.

* * * * *